United States Patent
Peffley et al.

(10) Patent No.: US 7,201,142 B2
(45) Date of Patent: Apr. 10, 2007

(54) VARIABLE CENTER PIVOT TUMBLE CONTROL VALVE GEOMETRY FOR AN INTAKE MANIFOLD

(75) Inventors: Thomas R. Peffley, Penfield, NY (US); Keith A. Confer, Flushing, MI (US); Ian R. Jermy, Leroy, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/210,958

(22) Filed: Aug. 24, 2005

(65) Prior Publication Data

US 2007/0044754 A1    Mar. 1, 2007

(51) Int. Cl.
*F02D 9/08* (2006.01)
*F02D 9/10* (2006.01)

(52) U.S. Cl. ...................... 123/337; 123/336

(58) Field of Classification Search ............... 123/306, 123/301, 302, 308, 337, 432, 336, 184.56
See application file for complete search history.

(56) References Cited

U.S. PATENT DOCUMENTS

| | | | |
|---|---|---|---|
| 3,809,361 A * | 5/1974 | Pfundstein et al. ......... 251/305 |
| 4,323,038 A * | 4/1982 | Motosugi et al. ...... 123/188.14 |
| 5,315,975 A * | 5/1994 | Hattori et al. ............... 123/337 |
| 5,359,972 A | 11/1994 | Isaka |
| 5,551,392 A * | 9/1996 | Yamaji et al. ............... 123/306 |
| 5,564,383 A | 10/1996 | Isaka et al. |
| 5,575,248 A | 11/1996 | Tada |
| 5,640,941 A * | 6/1997 | Hazen et al. ................ 123/306 |
| 5,671,703 A | 9/1997 | Otome et al. |
| 5,709,190 A | 1/1998 | Suzuki |
| 5,724,927 A | 3/1998 | Suzuki |
| 5,749,336 A * | 5/1998 | Tamaki et al. ............... 123/337 |
| 5,775,288 A | 7/1998 | Suzuki et al. |
| 5,794,587 A | 8/1998 | Isaka |
| 5,826,560 A | 10/1998 | Ito |
| 5,850,813 A * | 12/1998 | Cooney et al. ......... 123/184.46 |
| 5,865,153 A | 2/1999 | Matsumoto |
| 5,908,018 A | 6/1999 | Suzuki |
| 5,913,298 A | 6/1999 | Yoshikawa |
| 5,954,019 A | 9/1999 | Yoshikawa et al. |
| 5,979,871 A * | 11/1999 | Forbes et al. ................ 251/305 |

(Continued)

FOREIGN PATENT DOCUMENTS

JP    7293304    11/1995

(Continued)

*Primary Examiner*—Mahmoud Gimie
(74) *Attorney, Agent, or Firm*—Paul L Marshall

(57) ABSTRACT

A tumble control valve for an intake manifold of an engine which eliminates or substantially reduces air leakage between the bottom and sides of the valve blade through a selected rotational segment of the blade as it moves from the closed position toward the open position. The sealed area is maintained by contouring the inner cavity wall to track the arc defined by the bottom edge of the rotating blade. In other embodiments, a flexible flange or wedge-shaped element is attached to the blade to engage the inner cavity wall through the selected rotational segment. In another aspect of the invention, air flow pressure is maintained and tumble is optimized compared to rotational movement of the blade by contouring the top wall surface to track the arc defined by the rotating upper edge of the blade.

25 Claims, 7 Drawing Sheets

U.S. PATENT DOCUMENTS

| | | | |
|---|---|---|---|
| 6,047,950 A * | 4/2000 | Pontoppidan et al. | 251/305 |
| 6,053,145 A | 4/2000 | Suzuki et al. | |
| 6,131,554 A | 10/2000 | Ito et al. | |
| 6,253,729 B1 | 7/2001 | Suzuki et al. | |
| 6,408,809 B2 | 6/2002 | Suzuki | |
| 6,454,242 B1 | 9/2002 | Garrick et al. | |
| 6,553,961 B2 | 4/2003 | Hammoud et al. | |
| 6,604,506 B2 * | 8/2003 | Tanaka et al. | 123/336 |
| 6,772,730 B2 * | 8/2004 | Kohlen | 123/337 |
| 6,971,632 B2 * | 12/2005 | Elliot et al. | 251/305 |

FOREIGN PATENT DOCUMENTS

| | | |
|---|---|---|
| JP | 7332093 | 12/1995 |
| JP | 2001003755 | 1/2001 |
| JP | 2002070566 | 3/2002 |

\* cited by examiner

VARIABLE CENTER PIVOT TUMBLE CONTROL VALVE GEOMETRY FOR AN INTAKE MANIFOLD

TECHNICAL FIELD

The present invention relates to flow control devices and methods in an internal combustion engine, and more particularly relates to a tumble control valve uniquely configured for improved control of air flow through the intake manifold of the engine.

BACKGROUND OF THE INVENTION

It is generally known in the art of internal combustion engine design to use tumble control valves in an intake manifold. "Tumble" is understood to mean air turbulence about an axis perpendicular to the longitudinal axis of the cylinder. The opposite of tumble is known as "swirl" which is air turbulence rotating about an axis generally parallel to the cylinder axis. Thus, tumble control valves work, during certain selected engine conditions, to induce tumble to the air flow as the air flow enters a cylinder chamber. It has been shown that tumbling of the air flow improves the homogeneity of the fuel-air mixture which will thus burn more effectively. Tumble is particularly desirable and effective during the first 20 seconds of a cold engine start and also at light engine load conditions (e.g., less than about 3,000 rpm).

Prior art tumble control valves generally comprise a valve body having an internal cavity and a valve flap or blade pivotally disposed within the internal cavity of the valve body. The valve blade pivots between fully open and fully closed positions. When in the fully closed position, the blade lies substantially perpendicular to the longitudinal axis of the valve body. In this position, the bottom edge of the blade lies in close relationship to the bottom wall of the internal cavity, thus effectively sealing off this area to air flow. Conversely, the top edge of the blade lies in spaced relation to the top wall of the internal cavity to define a gap wherethrough air may flow. Thus, in the fully closed position of the valve blade, maximum tumble is generated since the air flow is forced to pass through the gap defined along the top wall of the internal cavity of the valve body. In these prior art tumble control valves, as soon as the blade begins to pivot from the fully closed position, another gap immediately opens between the blade bottom edge and the internal cavity bottom wall. This is due to the fact that the distance between the blade bottom edge and the internal cavity bottom wall increases as the blade is pivoted toward the open position. This gap thus becomes continuously larger as the blade pivots to the fully open position. It will be appreciated that once this bottom gap opens, air will flow through it as well as the top gap and the amount of tumble will be reduced accordingly. While tumble is not needed or intended to be produced in the fully open position of the valve, a reduction in tumble is generally undesirable through small rotations of the blade from the fully closed position. For example, manufacturing tolerances often are not tight enough to consistently and reliably cause the valve to be in the fully closed position when it should be (e.g., at cold start of engine). Thus, in conditions where the valve should by fully closed, the valve blade may have unintentionally rotated away from the fully closed position by several degrees. Should this occur, a bottom gap forms and tumble is thereby reduced from its maximum potential as described above. Fuel efficiency and emissions control thereby also suffer, an undesirable consequence.

SUMMARY OF THE INVENTION

In a first aspect, the present invention addresses the above-noted deficiencies of prior art tumble control valves by providing a tumble control valve which maintains the seal area between the bottom edge of the valve blade and the internal bottom wall of the valve body cavity through at least a segment of the full 90° rotation of the blade from the fully closed position toward the fully open position. In a first embodiment, this is achieved by contouring the internal cavity bottom wall of the valve body such that the bottom edge of the valve blade remains in close relationship thereto through the desired segment of the rotation of the valve blade as it moves toward the fully open position. For example, in a valve where it is intended that the area between the bottom edge of the valve blade and the valve body remain sealed through a 20° rotation from the fully closed position, the internal cavity of the valve body lying along the 20° rotation is shaped to follow the bottom edge of the valve blade through the 20° rotation thereof. In other words, the internal cavity surface and the bottom edge of the valve blade are cooperatively shaped to maintain the sealed relationship between these parts through a desired rotation of the valve blade as it moves away from the fully closed position. The term "sealed" as used herein is not limited to an air-tight seal but rather is to be interpreted broadly to include a positional relationship between two parts (in this case the bottom edge of the valve blade and the interior cavity wall of the valve body) that retards air leakage between the parts such that maximum tumble effect is maintained through the selected segment of the rotation of the blade.

In another embodiment of the invention, the bottom edge of the valve blade is provided with a flexible flange that is dimensioned to slide along the internal cavity wall through the desired segment of rotation of the blade from the fully closed position of the valve toward the fully open position. The flexible flange may be a separate piece that is affixed to the valve blade, or it may be formed integrally therewith and be of the same or dissimilar material as the blade. Other geometries and material properties are of course possible and within the scope of the invention. For example, in yet another embodiment, the bottom edge of the valve blade is provided with an extension having a curved surface dimensioned to maintain a seal between itself and the internal cavity wall through the desired segment of blade rotation. In this embodiment, the curved surface may be relatively stiff and integral with or separately attached to the valve blade bottom edge.

It is noted that contouring of the internal cavity wall may or may not be combined with providing the bottom edge of the blade with a flexible flange or other geometry in yet further embodiments of the invention.

In a second aspect, the invention improves tumble control valve performance by contouring the top wall of the internal cavity. This may done for two purposes: 1) to optimize the tumble index relative to valve blade rotation; and/or 2) to prevent or substantially reduce an air pressure drop in the area across the blade when in the fully open position. Regarding the first purpose, the top wall may be contoured to maintain or otherwise control the size of the tumble gap through a selected rotation of the valve blade from the fully open position. This contour is thus used to refine and optimize the desired tumble effect not only at the fully open position of the valve blade, but also through the selected rotational movement thereof from the fully open position. Regarding the second purpose, pressure drop occurs in prior art tumble control valves since the blade itself necessarily occupies a volume in the valve body wherethrough the air flows. In the fully open position of the valve, it is intended that air flow unimpeded into the intake manifold. However, since the blade, which lies parallel to the direction of air flow and is suspended in the valve body in the fully open position, occupies a volume of the valve body, the air flow undergoes a pressure drop as it passes over and under the valve blade. The second aspect of the invention overcomes this problem of prior art tumble control valves by increasing the volumetric area of the valve body in the area of the valve blade to compensate for the volume occupied the valve blade. As stated above, this may be accomplished by contouring the top wall of the internal cavity of the valve body. This second aspect of the invention may be used alone or in combination with any embodiment of the first aspect of the invention

BRIEF DESCRIPTION OF THE DRAWING

The present invention will now be described, by way of example, with reference to the accompanying drawings, in which.

DESCRIPTION OF THE PREFERRED EMBODIMENTS

Figure 1:
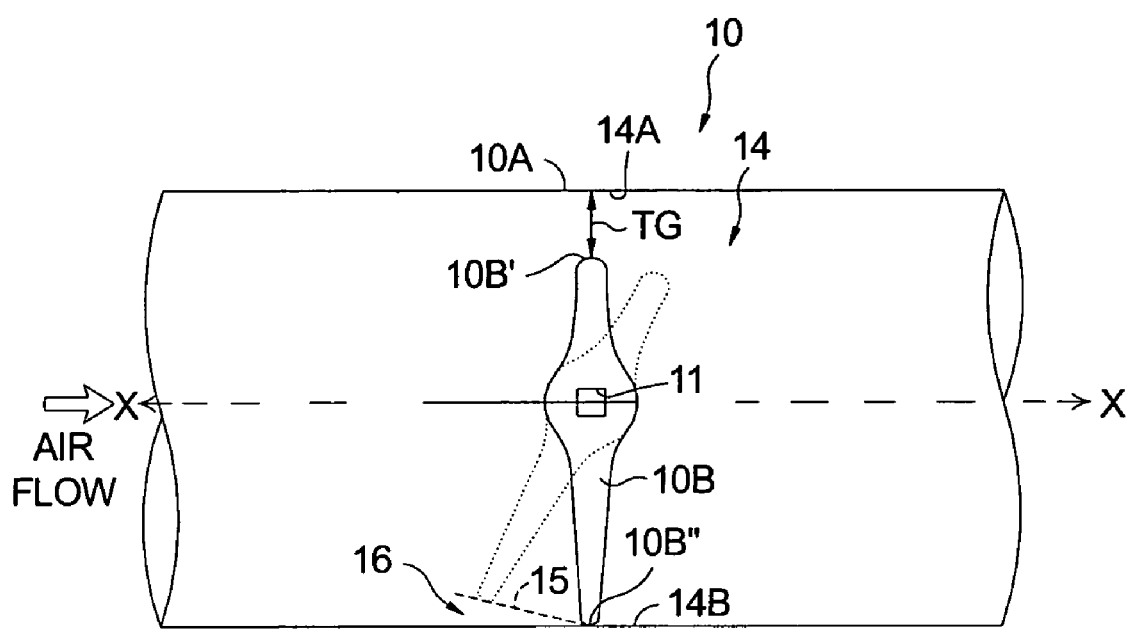
FIG. 1 is a side elevation view in section of a prior art tumble control valve.
Figure 2:
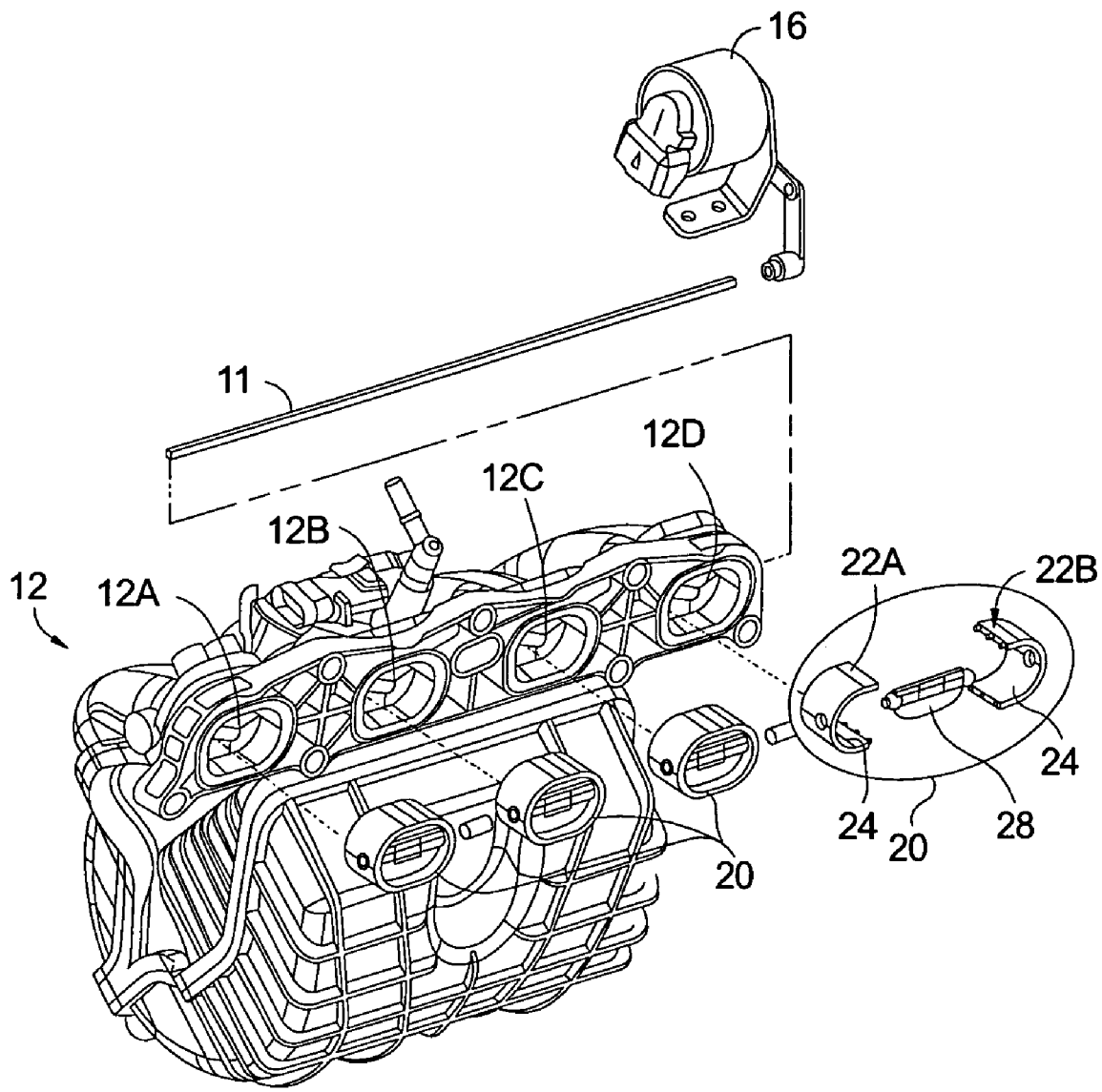
FIG. 2 is a perspective view of an engine intake manifold showing the tumble control valves in spaced relation to the manifold intake ports, and the valve actuator spaced from the side of the manifold.

Referring now to the drawing, there is seen in FIG. 1 a prior art tumble valve 10 used to control air flow into the intake manifold 12 of an internal combustion engine as seen in FIG. 2 (the entire engine not shown). Prior art valve 10 is comprised of basically two parts: a valve body 10A and a valve blade 10B. A rod 11 pivotally connects blade 10B inside the internal cavity 14 of valve body 10A. In the fully closed position of the valve, an air tumble gap TG is defined between the upper blade edge 10B' and the upper wall 14A of the internal cavity 14 of the valve body 10A. As air flows through tumble gap TG, it undergoes tumble as the air enters the intake manifold 12 and associated cylinder (not shown). Tumble refers to the air rotating about an axis extending perpendicular to the cylinder axis and has proven useful in optimizing lean burn strategies during certain engine operating conditions (e.g. at cold start or light engine load conditions). An actuator 16 is used to control the valve rod 11 (see FIG. 2) and hence rotation of the valve blade 10B in response to operating condition signals received from the engine. When tumble is not needed as indicated by the engine condition, the actuator 16 causes the valve to open and allow the air to flow therethrough unimpeded.

In the fully closed position of valve blade 10B a seal is formed between the bottom edge 10B" thereof and the bottom wall 14B of the internal cavity as seen in solid lines in FIG. 1. As the valve blade 10B rotates from the fully closed position toward the open position (as seen in dotted lines in FIG. 1), a lower gap LG forms between the blade lower edge 10B" and the lower wall 14B of the internal cavity 14. This is due to the fact that in the prior art tumble control valves, the valve internal cavity lower wall 14B extends substantially parallel to the longitudinal axis X—X of the valve body 10A. Thus, as the blade 10B rotates about rod 11, the bottom edge 10B" thereof extends along an arc 15 which is not parallel to the longitudinal axis X—X of the valve body and a lower gap LG is thus created therebetween. Once gap LG forms, air is allowed to travel through this lower gap LG which reduces the maximum efficiency of the tumble generated by the upper tumble gap TG. The lower gap LG begins forming immediately as the blade moves away from the fully closed position and continues to enlarge as the blade travels toward the fully open position. As explained above, it would be desirable to maintain maximum tumble through at least a segment of the rotation of the valve blade 10B as it moves away from the fully closed position toward the fully open position.

Referring now to a first embodiment of the invention, there is seen in FIG. 2 a first embodiment of the inventive tumble control valve 20. In FIG. 2, an intake manifold 12, which itself does not form part of the invention, is seen to include four intake ports 12A–12D leading to four respective cylinders (not shown). Four tumble valves 20 are thus provided to be installed in a respective one of the four intake ports 12A–12D (one of the four valves is shown in exploded view). The intake ports 12A–12D each have a respective internal cavity defined by what is termed in the art as a runner. When properly installed in the intake port, the internal cavity wall of the valve body aligns with the runner in a generally coplanar, uninterrupted manner. Air is drawn through the valves and into the intake manifold which leads into the respective cylinder as explained above.

Figure 3:
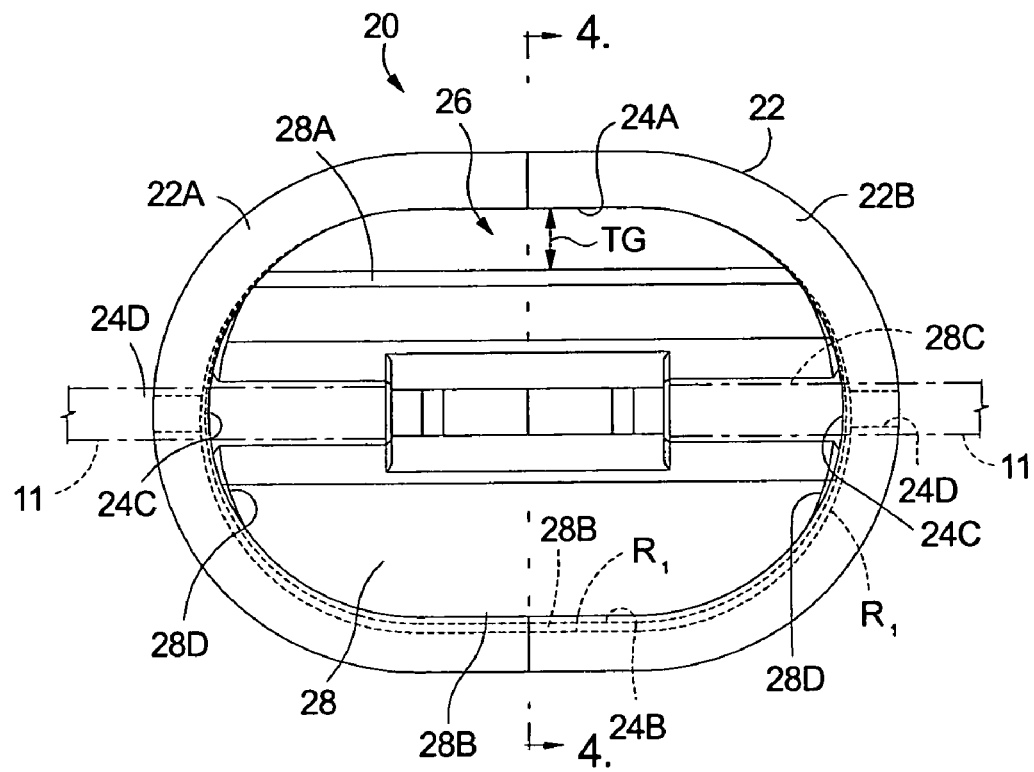
FIG. 3 is an end view of one embodiment of the present invention.
Figure 4:
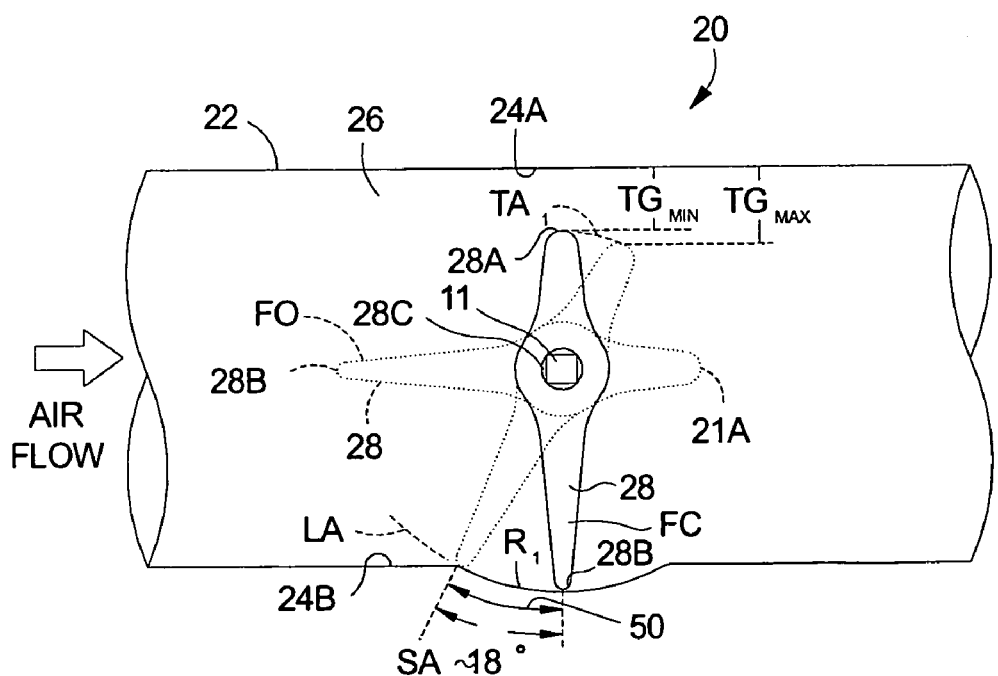
FIG. 4 is a cross-sectional view of the valve body as taken generally along the line 4—4 in FIG. 3.

Referring now also to FIGS. 3 and 4, valve 20 is seen to include a valve body 22 which may (although not necessarily as explained below) be formed in two halves 22A, 22B to facilitate manufacture of the contoured surfaces of the interior cavity walls as described more fully below. Valve body 22 includes an internal wall surface having upper wall surface 24A, lower wall surface 24B and side wall surfaces 24C, all contiguously defining an internal cavity 26. A valve blade 28 having upper edge 28A and lower edge 28B is provided and includes a longitudinally extending throughhole 28C wherethrough rod 11 extends to pivotally connect and operate blade 28 inside the valve cavity 26.

In a first aspect of the invention, the tumble effect of valve 20 is maintained through a selected segment of the entire 90° rotational movement of the blade 28 from the fully closed position FC seen in solid lines toward the fully open position FO seen in dashed lines in FIG. 4. In a first embodiment of the invention, this is achieved by contouring the interior cavity wall lower surface 24B with an indented radius $R_1$ such that it tracks the lower arc LA defined by the bottom edge 28B of the blade 28 as it rotates away from the fully closed position. In this way, the bottom edge 28B of the blade and the interior lower wall surface 24B remain in close proximity to each other and thereby maintain the seal area SA through this lower arc segment LA of the full 90° rotational movement of the blade. It is noted that radius $R_1$ is not necessarily equal across the entire seal area SA but rather is defined by the dimensions of the blade bottom and side edges and the arc path they make through the selected rotational segment. In a preferred embodiment of the invention, the enhanced seal area SA extends through a rotation of between about 3° and 20° although rotational segments outside this range may be chosen according to the requirements of the particular engine and lean burn strategy employed. In one preferred embodiment, the selected rotational segment 50 is about 18° as indicated in the embodiment of FIG. 4.

Contouring of the inner wall surface may be accomplished using any known manufacturing method and may differ depending on the type of material used for the valve body 22. If a metal valve body is employed, the contoured surface may be machined. Alternatively, valve body 22 may be injection molded of a hard, heat-resistant plastic such as Nylon 66, for example. In this instance, the contouring is replicated by the mold which is machined with a negative profile of the contour area. This may be easily accomplished by providing the valve body in two halves 22A and 22B wherein each body half may be formed in a separate mold cavity such that the contoured surface does not interfere with the direction of draw. The two halves are thereafter assembled together with the blade pivotally connected therein (see FIG. 2). Alternatively and as seen best in FIGS. 5A and 5B, the valve body 22 may be formed as a unitary piece using a mold insert (not shown) to form the internal cavity 26 dimensions. The molded part may be stretched off the mold insert or the insert may be made to disintegrate (lost core) after curing of the mold part.

Figure 5A:
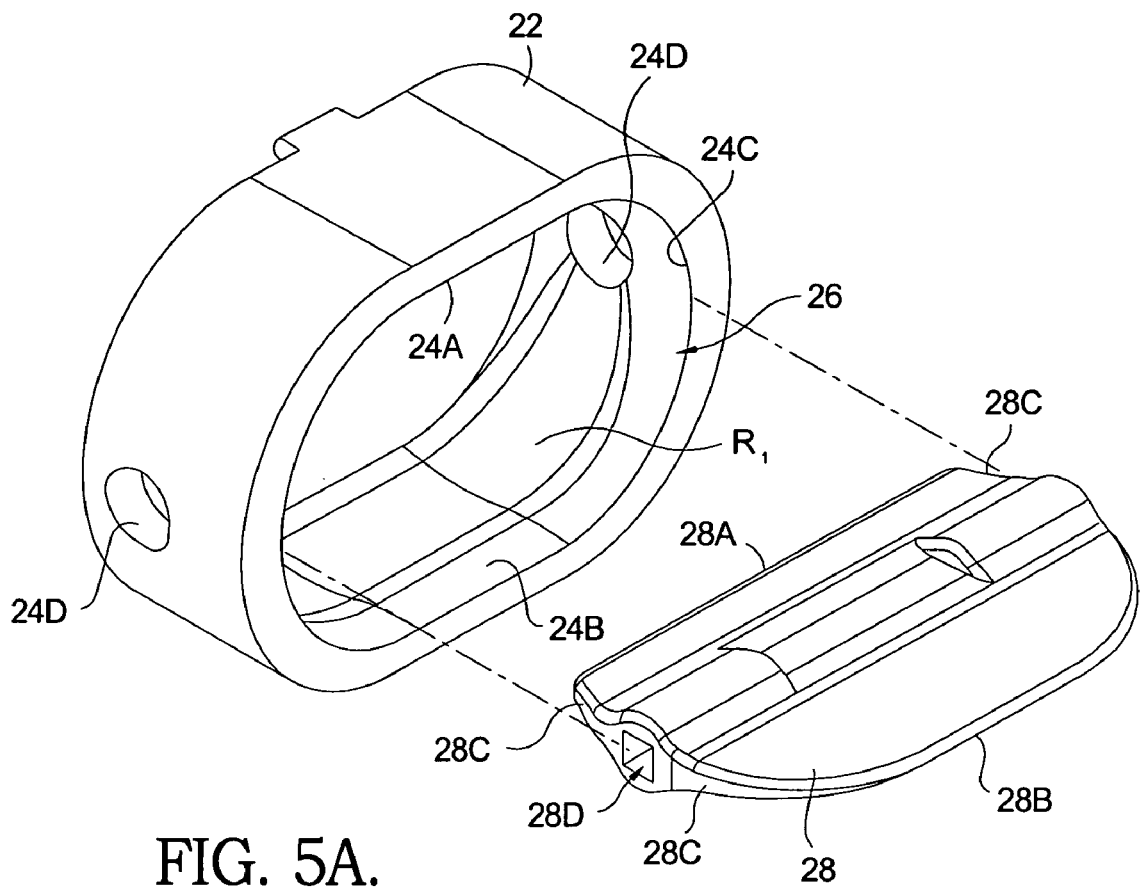
FIGS. 5A and 5B are perspective views showing an embodiment of a unitary valve body with the blade disassembled and assembled with the body, respectively.
Figure 5B:
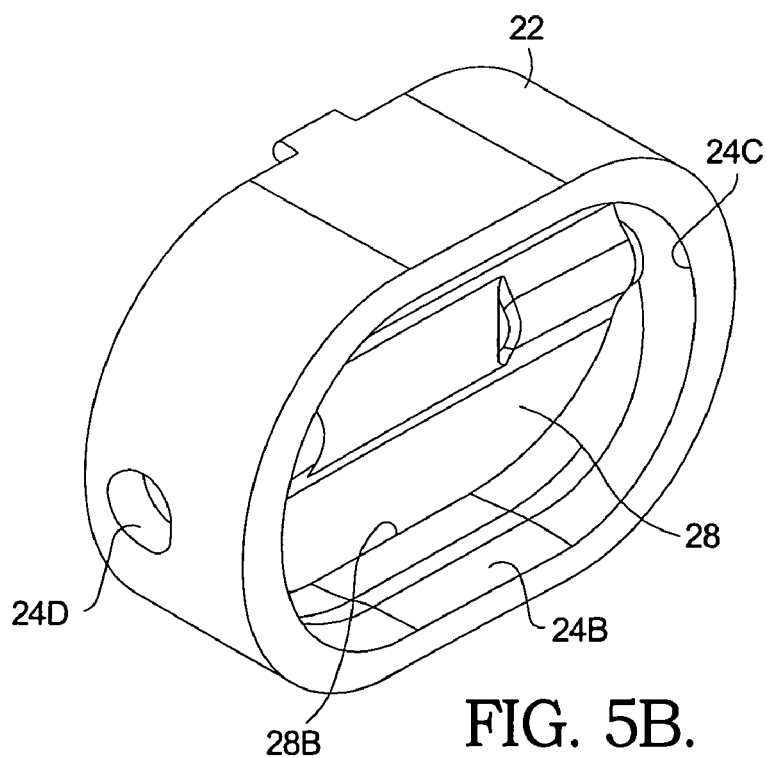
Figure 6:
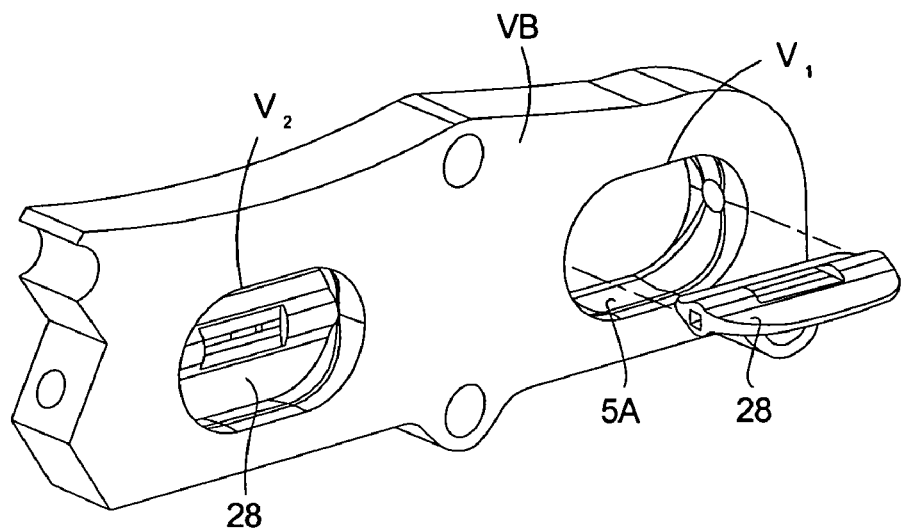
FIG. 6 is an embodiment of the invention showing two valve bodies formed from a single piece of material.

FIG. 6 illustrates another embodiment where more than one valve V1, V2 . . . Vn may be incorporated in longitudinally spaced arrangement in a single valve body VB which may be made according to any of the above methods. To assemble the valve, the valve blade 28 is inserted into the valve body 22 as if in the fully open position as seen in FIGS. 5A and 6. With the blade pivot hole 28C aligned with the body pivot holes 24D, the pivot rod 11 (FIGS. 2 and 3) is extended therethrough and thereby pivotally connecting the blade 28 to the body 22 inside cavity 26. The blade 28 may then be pivoted to its fully closed position FC as seen in FIGS. 4 and 5B.

The contoured seal area SA is thus configured as an indented radius $R_1$ in the interior cavity wall surface, the radius dimensions being chosen such that it tracks the lower arc LA defined by the bottom edge 28B of the rotating valve blade 28 through the selected rotational segment 50 thereof. The contoured seal area SA may extend along the interior cavity side wall surfaces 24C to maintain the seal area SA along the side edges of the blade as well as at the bottom edge of the blade through the selected rotational arc. This is seen best in FIG. 3 where the contoured area of radius $R_1$ continues uninterrupted from the interior bottom wall 24B to the side walls 24C. The complete outline of the contour seal area SA is, as explained above, dictated by the arc LA defined by the bottom edge 28B and the side edges 28D of the blade 28 through the selected rotational segment 50 thereof.

It will be realized that once the bottom edge 28B of the valve blade has traveled past the contoured seal area SA, a lower gap LG immediately begins to form and enlarge as the blade travels toward the fully open position FO. The point at which the contoured seal area SA stops and the lower gap LG begins to form is the outer limit of the contoured seal area SA. Thus, while the blade 28 rotates in either direction within the seal area SA, air is substantially prevented from leaking between the valve blade side edges 28D and bottom edge 28B and tumble is maintained at the tumble gap TG. All rotational positions of the blade beyond this seal area SA, as directed to move by the engine signals, do not require tumble effect and air may thus travel between the blade bottom edge 28B and side edges 28D with no compromise in the intended engine performance effects of the valve.

Figure 7:
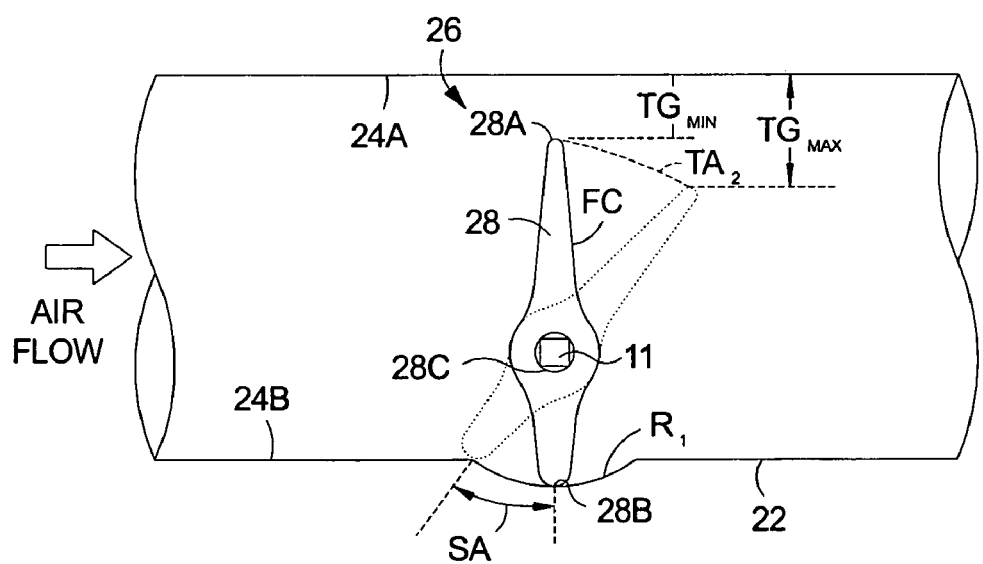
FIG. 7 is the view of FIG. 4 except showing an embodiment of the invention with an offset pivot axis.

FIG. 7 illustrates how the seal area SA and tumble gap TG may be selectively varied by repositioning the through-hole 28C (and thus also the pivot axis) of the blade. In this embodiment, the through-hole 28C has been moved toward the lower wall 24B of the interior cavity 26. As such, the tumble gap range going from $TG_{Min}$ to $TG_{Max}$, with no appreciable air leakage at the bottom or sides of the blade, has increased. Stated another way, the blade top edge 28A traverses a larger top arc $TA_2$ in the embodiment of FIG. 7 compared to the top arc $TA_1$ of the embodiment seen in FIG. 4 where the pivot axis is substantially centered in the valve body 22.

Figure 8A:
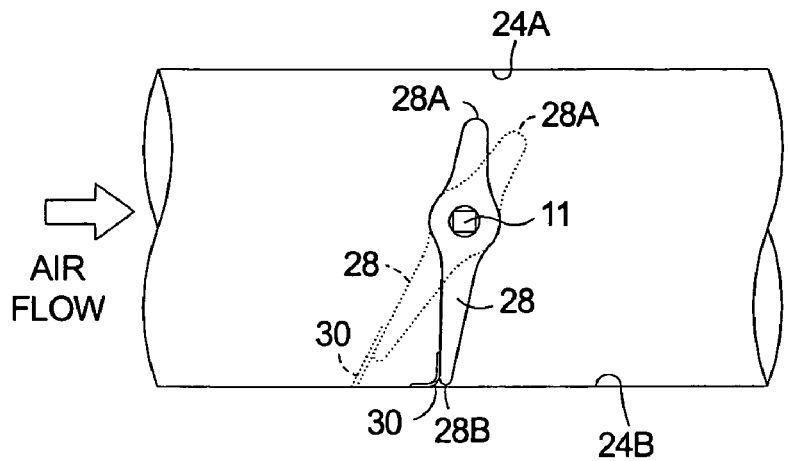
FIG. 8A is a side elevational view of an embodiment of the invention wherein the bottom edge of the blade is provided with a flexible flange to create the seal area.
Figure 8B:
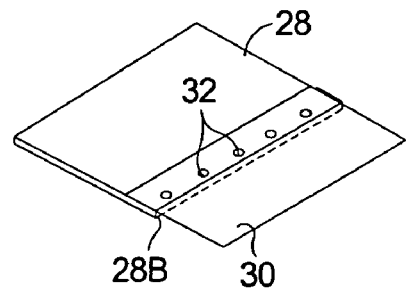
FIG. 8B is a perspective view showing one possible method of attaching the flexible flange to the blade.

Another embodiment of the invention is seen in FIGS. 8A,B wherein a blade extension in the form of a flexible flange 30 traverses and extends from the bottom edge 28B of blade 28. Since the flange is flexible, it operates to create a seal along the selected rotational segment by flexing when in the fully closed position and automatically straightening as the blade moves toward the fully open position, all the while maintaining contact with the interior cavity lower wall 24B through the selected rotational segment. The length of the flexible flange 30 as measured from the bottom edge 28B of the blade is selected so as to maintain the seal along the selected rotational segment of the blade. In this respect, although not shown, it is noted that the flange 30 may extend about the side edges 28D of the blade to prevent air leakage in this area as well. The flexible flange may be made of any desired and appropriate material (e.g., flexible TEFLON) and may be separately attached or integrally formed with the blade. In the embodiment of FIG. 8B, the flexible flange is attached to the bottom edge of the blade with a plurality of heat staked plastic retainers 32. It is further noted that although absent in the embodiment of FIG. 8A, contouring of the interior lower and side wall surfaces as described in the embodiments above may be combined with the flexible flange if desired in yet another embodiment of the invention.

Figure 9:
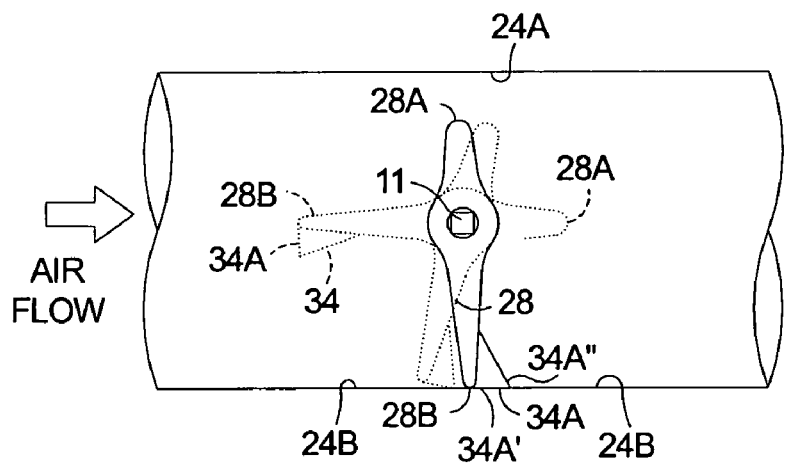
FIG. 9 is a side elevational view of an embodiment of the invention wherein the bottom edge of the blade is provided with a wedge-shaped element to create the seal area.

In yet a further embodiment of the invention seen in FIG. 9, a blade extension is provided in the form of a wedge-shaped element 34 that traverses the bottom and side edges of the blade in the same manner as the flexible flange described above. The wedge-shaped element 34 includes a curved bottom surface 34A which aligns with the bottom edge 28B of the blade. The arc length of the curved bottom surface 34A defines the selected rotational segment of the seal area as it maintains contact with the lower wall surface 24B of the interior cavity from the leading edge 34A' to the trailing edge 34A" thereof. Geometries other than wedge-shaped are possible and within the scope of the invention (e.g., sickle-shaped).

Figure 10:
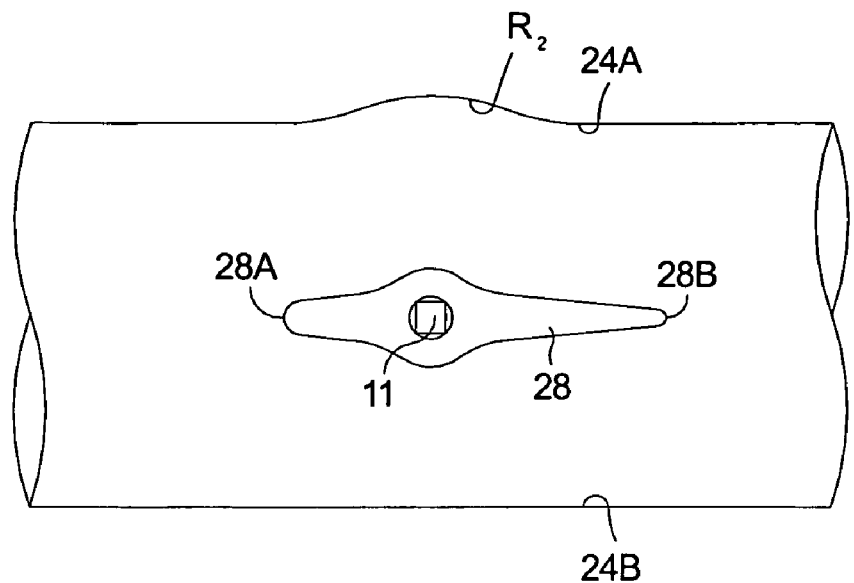
FIG. 10 is a side elevational view of yet another embodiment of the invention where only the top wall is contoured and showing the valve blade in the fully open position.
Figure 11:
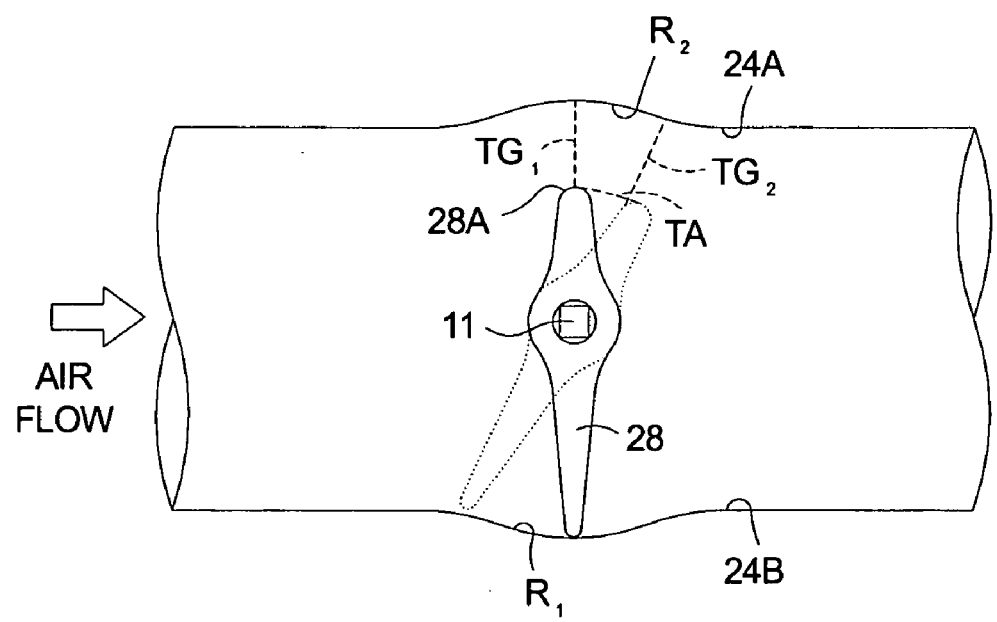
FIG. 11 is a side elevational view of another embodiment of the invention where both the bottom and top walls of the runner are contoured and showing the blade in various rotational positions.

In a second aspect of the invention, air pressure through the valve in the fully open position is maintained substantially constant by contouring the upper wall surface 24A with a radius $R_2$ as seen in FIGS. 10 and 11. In FIG. 10, the upper wall surface 24A is contoured to compensate for the volumetric area occupied by the blade 28 in the fully open position. As such, air flow is not reduced as it travels past the blade and air pressure is maintained. Contouring of the upper wall surface may also be used to optimize the tumble index versus valve rotation. In this regard, the size of the tumble gap TG may be selectively defined and controlled simultaneously with the lower seal area SA throughout the selected rotational segment of the blade. For example, in the embodiment of FIG. 11, the upper wall surface is contoured with a radius $R_2$ to track the top arc TA defined by the rotational movement of the upper edge 28A of the blade. As such, in this embodiment, the tumble gap TG will remain substantially constant in size through this rotational segment where $TG_1 = TG_2$ in FIG. 11. Once the blade 28 rotates beyond this segment, a lower gap begins to form and enlarge while the tumble gap TG begins to enlarge and thereby decrease the tumble effect as the blade continues toward the fully open position.

What is claimed is:

1. In a tumble control valve for an internal combustion engine, said valve including:
    a valve body having top and bottom internal surfaces together defining at least a segment of an internal cavity having a longitudinal axis; and
    a valve blade having top and bottom edges and pivotally movable through substantially about a 90° rotation between fully open and fully closed positions in said internal cavity,
    said fully closed position being defined by said blade lying substantially perpendicular to said longitudinal axis with said blade bottom edge lying in substantially sealed engagement with said bottom internal surface and with said blade top edge lying in spaced relation to said internal top surface and thereby defining a gap wherethrough air may flow and undergo tumble,
    said fully open position being defined by said blade lying substantially parallel to said longitudinal axis whereby air may flow between said blade and said top and bottom internal surfaces with no or at least reduced tumble compared to said fully close position, wherein the improvement comprises:
    at least a segment of said internal bottom surface and said blade bottom edge being cooperatively configured such that said substantially sealed engagement is maintained from said fully closed position through at least a segment of said 90° rotation as said blade pivots from said fully closed to said fully open position, wherein said internal top surface and said blade top edge are cooperatively configured to substantially maintain the size of said gap through at least a segment of said angular rotation as said blade pivots from said fully closed to said fully open position.

2. The valve of claim 1 wherein said sealed engagement is maintained through an angular rotation of between about 3° and 20°.

3. The valve of claim 1 wherein said sealed engagement is maintained through an angular rotation of about 18°.

4. The valve of claim 1 wherein pivoting of said valve between said fully open and closed positions is in response to one or more predetermined signals received from the engine.

5. The valve of claim 4 wherein one of said signals is indicative of engine load.

6. The valve of claim 4 wherein one of said signals is indicative of engine speed.

7. In a tumble control valve for an internal combustion engine, said valve including:
    a valve body having top and bottom internal surfaces together defining at least a segment of an internal cavity having a longitudinal axis; and
    a valve blade having top and bottom edges and pivotally movable through substantially about a 90° rotation between fully open and fully closed positions in said internal cavity,
    said fully closed position being defined by said blade lying substantially perpendicular to said longitudinal axis with said blade bottom edge lying in substantially sealed engagement with said bottom internal surface with said blade top edge lying in spaced relation to said internal top surface and thereby defining a gap wherethrough air may flow and undergo tumble,
    said fully open position being defined by said blade lying substantially parallel to said longitudinal axis whereby air may flow between said blade and said top and bottom internal surfaces with no or at least reduced tumble compared to said fully close position, wherein the improvement comprises:
    said blade bottom edge including a flexible flange configured to maintain contact with said bottom internal surface and thereby also said sealed engagement through at least a segment of said angular rotation as said blade pivots from said fully closed to said fully open position.

8. The valve of claim 7 wherein said sealed engagement is maintained through an angular rotation of between about 3° and 20°.

9. The valve of claim 7 wherein said sealed engagement is maintained through an angular rotation of about 18°.

10. The valve of claim 7 wherein pivoting of said valve between said fully open and closed positions is in response to one or more predetermined signals received from the engine.

11. The valve of claim 10 wherein one of said signals is indicative of engine load.

12. The valve of claim 10 wherein one of said signals is indicative of engine speed.

13. The valve of claim 7 wherein said internal top surface and said blade top edge are cooperatively configured to substantially maintain the size of said gap through at least a segment of said angular rotation as said blade pivots from said fully closed to said fully open position.

14. A tumble control valve comprising:
    a) a valve body having first and second body halves having a parting line lying parallel to the longitudinal axis of said valve body; and
    b) a blade pivotally disposed in said valve body, said blade pivotable between fully open and fully closed positions, said fully closed position configured to create tumble of an air flow through said valve body.

15. The valve of claim 14 where said valve body halves are injection molded with the direction of draw from the mold being substantially perpendicular to said longitudinal axis.

16. The valve of claim 15 wherein said valve body includes an internal cavity defined at least in part by internal top and bottom surfaces, and wherein said bottom surface and a bottom edge of said blade are cooperatively configured to form a seal through at least a segment of said 90° rotation as said blade pivots from said fully closed to said fully open position.

17. The valve of claim 16 wherein said internal top surface and a top edge of said blade are cooperatively configured to form a gap of substantially constant size through at least a segment of said 90° rotation as said blade pivots from said fully closed to said fully open position.

18. The valve of claim 17 wherein a bottom edge of said blade includes a flexible flange configured to form a seal with said bottom internal surface through at least a segment of said 90° rotation as said blade pivots from said fully closed to said fully open position.

19. The valve of claim 18 wherein said top internal surface and a top edge of said blade are cooperatively formed to define a gap of substantially constant size through at least a segment of said 90° rotation as said blade pivots from said fully closed to said fully open position.

20. A method of controlling air tumble through an intake manifold of an internal combustion engine, said method comprising the steps of:
   a) providing a valve having a valve body defining an internal cavity and a valve blade disposed in said internal cavity and pivotable between fully open and fully closed positions, said tumble being at a maximum when said blade is in said fully closed position and said tumble being at a minimum when said blade is in its fully open position;
   b) maintaining said maximum tumble through an angular rotation of said blade as said blade is moved by an actuator from said fully closed position to a point between said fully closed and fully open positions; and
   c) substantially maintaining the size of a gap between a top edge of said valve blade and an internal top surface of said valve body through at least a segment of said angular rotation as said valve blade pivots from said fully closed to said fully open position.

21. The method of claim 20 wherein maintaining maximum tumble is achieved by cooperatively configuring a segment of said internal cavity and a bottom edge of said blade such that said blade bottom edge and said internal surface segment create a seal therebetween during the step of maintaining maximum tumble.

22. The method of claim 20 wherein said angular rotation is between about 3° and 20°.

23. The method of claim 20 wherein said angular rotation is about 18°.

24. A tumble control valve comprising:
   a) a valve body having internal top, bottom and side walls all defining an internal cavity;
   b) a valve blade pivotally mounted in said internal cavity for rotating substantially 90° between fully open and closed positions, said valve blade having top, bottom and side edges, said bottom edge lying closely adjacent said valve body bottom, wall and said top edge lying spaced from said valve body top wall to define a tumble gap when said blade is in said fully closed position;
   wherein said bottom wall is contoured to lie closely adjacent said blade bottom edge through a selected rotational segment of said blade when moving from said fully closed position, and
   wherein said internal top wall and said blade top edge are cooperatively configured to substantially maintain the size of said tumble gap through at least a segment of said 90° rotation as said valve blade pivots from said fully closed to said fully open position.

25. A tumble valve comprising:
   a) a valve body having an internal cavity defined by internal top, bottom and side walls;
   b) a valve blade pivotally mounted in said cavity;
   wherein said bottom wall is contoured to substantially prevent air leakage between said bottom wall and said blade through a selected rotational segment of said blade, and
   wherein said internal top wall and a top edge of said valve blade are cooperatively configured to substantially maintain the size of a tumble gap through at least a segment of an angular rotation of said valve blade as said valve blade pivots from said fully closed to said fully open position.

* * * * *